United States Patent [19]
Carroll

[11] Patent Number: 5,237,594
[45] Date of Patent: Aug. 17, 1993

[54] NUCLEAR ACTIVATION METHOD AND APPARATUS FOR DETECTING AND QUANTIFYING EARTH ELEMENTS

[75] Inventor: James F. Carroll, Lafayette, La.

[73] Assignee: Schlumberger Technology Corporation, Houston, Tex.

[21] Appl. No.: 696,307

[22] Filed: Apr. 29, 1991

Related U.S. Application Data

[63] Continuation-in-part of Ser. No. 497,376, Mar. 22, 1990, abandoned.

[51] Int. Cl.[5] .............................................. G21G 1/06
[52] U.S. Cl. .................................... 376/160; 162/163
[58] Field of Search ............... 376/160, 162, 154, 163, 376/167; 250/270

[56] References Cited

U.S. PATENT DOCUMENTS

| | | | |
|---|---|---|---|
| 3,514,598 | 5/1970 | Youmans | 376/162 |
| 3,781,545 | 12/1973 | Paap et al. | 250/83.3 R |
| 3,943,362 | 3/1976 | Peelman | 250/256 |
| 4,208,580 | 6/1980 | Schweitzer et al. | 250/262 |
| 4,467,642 | 8/1984 | Givens | 73/152 |
| 4,721,853 | 1/1988 | Wraight | 250/269 |
| 4,950,892 | 8/1990 | Olesen | 250/270 |

OTHER PUBLICATIONS

"The Aluminum Activation Log" by H. D. Scott & M. P. Smith, The Log Analyst, Sep.-Oct. 1973, pp. 3-12.
"Measuring Silicon Quantity: A Gravel Pack Analysis ALternative", by W. W. Carpenter, World Oil, Jan. 1990.
"Examples of Detection of Water Flow by Oxygen Activation on Pulsed Neutron Logs", W. H. M. De Rosset, Paper CCC of SPWLA Twenty-seventy annual logging symposium, Jun. 9-13, 1986.

Primary Examiner—Donald P. Walsh
Assistant Examiner—Meena Chelliah
Attorney, Agent, or Firm—Henry N. Garrana; Darcell Walker

[57] ABSTRACT

A nuclear apparatus for obtaining qualitative and quantitative information related to an element of earth formation surrounding a borehole, comprising: (1) a neutron source for irradiating the formation with neutrons of sufficient energy to activate atoms of at least a given element; (2) at least two (preferably four) detectors longitudinally spaced from said source, for detecting the gamma rays emitted during the activation reaction; (3) means for assigning a maximum number of counts for each detector and for establishing a relationship between these maximum number of counts and the corresponding instant of time counts for each detector; and (4) means for deriving from the relationship qualitative information related to the element.

The relationship is approximately a straight line, the slope of which is representative of the element of interest. The amplitude of the counts is representative of the quantity of the activated element and of the radial distance between the activated atoms and the borehole.

27 Claims, 3 Drawing Sheets

NUCLEAR ACTIVATION METHOD AND APPARATUS FOR DETECTING AND QUANTIFYING EARTH ELEMENTS

This is a continuation of application Ser. No. 07/497,376, filed Mar. 22, 1990, now abandoned.

BACKGROUND OF THE INVENTION

1. Field of the Invention

This invention relates generally to the detection and quantification of certain earth formation elements surrounding a borehole, and especially elements sensitive to the nuclear activation reaction.

2. Description of the related art

The detection and determination of certain elements present in an earth formation or in the well itself is of great importance in the oil production business, since the presence and amount of these elements provide useful information. Among the logging techniques used for such determination are the nuclear logging techniques, and particularly the nuclear activation method wherein a sonde comprising a high energy neutron source and a gamma ray detector is lowered in the well to investigate. Certain atoms interact with neutrons in being activated to an unstable state which decays back exponentially in time to a stable state, while emitting gamma rays of given energy representative of the activated atom. Count rates in the gamma ray detector are proportional to the total amount of the element of interest present around the sonde. By way of example, oxygen, silicon, aluminum, magnesium, or gold atoms may be activated.

Oxygen atoms are representative of water. For example, a well which has been determined to be promising for oil production, is provided with a metallic casing, and cement is injected between the earth formation and the casing. Perforations are then made through the casing/cement and in the oil productive formation, so as to allow oil to flow up to the surface through a tubing beforehand arranged in the well coaxially to the casing. Unwanted vertical flow of water can occur in the cement, between the casing and the formation. This phenomenon, usually called "water channeling", causes undesirable paths between formations located at different depths, i.e. at different pressures, e.g. by allowing water from a first formation layer to mix with oil coming from a second formation layer. This phenomenon disturbs substantially the oil production. It is of great importance to identify fluid points of entrance to or exit from the borehole, as well as to determine the mechanical integrity of the cement annulus.

The invention may also be used, besides the water flow detection hereabove referred to, to qualify gravel packing which is usually disposed in the annulus between the productive formation and the screened tubing, for preventing sand invasion in the tubing. As a matter of fact, aluminum and silicon are found in abundance in gravel-pack material. Aluminum e.g. is found in sintered bauxite and silicon in standard gravel pack. The use of the activation method for the detection of aluminum has been depicted in the article "The Aluminum Activation Log" from H. D. Scott and M. P. Smith, in The Log Analyst, Sep.-Oct. 1973, pages 3-12.

Magnesium is another element of interest which is sensitive to the activation reaction. Magnesium is indicative of the presence of shales.

Moreover, gold atoms, when bombarded with high energy neutrons, become activated. It is known to inject gold as a tracer in oil wells. Activated gold follows the fluid paths in the formation and thus, presence of gold is thus representative of fractures in the formations.

Accordingly, there is a need for a better knowledge relating to the above mentioned elements in the earth formation.

However, the known methods and apparatus, although satisfactory, show limitations.

First, they do not offer a straightforward and simple way to distinguish the different activated elements one from the other. As a matter of fact, the gamma rays received by the detector may come from different types of activated atoms.

Furthermore, the known methods do not generally provide any quick and reliable information about the radial distance between the activated elements and the borehole.

According to the above, there is a need for a reliable method for obtaining quantitative and qualitative information related to given earth formation elements able to be activated by neutrons.

SUMMARY OF THE INVENTION

An object of the invention is a logging method and apparatus providing reliable quantitative and qualitative information on elements able to be activated present in earth formation surrounding a borehole.

Another object of the invention is to identify the activated element(s).

A further object of the invention is to provide information on the radial distance between the activated atoms of the element of interest and the borehole.

An even further object of the invention is to provide a straightforward and simple method providing easily interpretable results to the user.

The foregoing and other objects are attained in accordance with the invention by a nuclear logging method for obtaining qualitative and quantitative information related to elements in earth formation surrounding a borehole, comprising the steps of:

(1) irradiating the formation with neutrons from a neutron source, the neutrons being of sufficient energy to interact with at least one element according to the activation reaction;

(2) detecting and counting, at at least two locations spaced from the source, the gamma rays resulting from the activation of the element;

(3) determining at each depth number of gamma ray counts detected during a time period starting when the neutron source passes that depth and ending when the detector passes that depth, this determination being made for each detector at each depth; and establishing a relationship between the instant times and the counts for all of the detecting locations; and (4) deriving from the relationship, for each depth, at least one characteristic of said element.

More particularly, the relationship is expressed in the form of a plot of counts versus time; the plot is approximately a straight line the slope of which is representative of the element of interest.

Moreover, the number of counts is representative of the quantity of the activated element at the depth at stake and of the radial distance between the activated element and the borehole.

In a preferred embodiment, the method includes moving in the borehole an elongated sonde comprising four detectors longitudinally spaced from the neutron source.

The present invention also contemplates a nuclear apparatus for obtaining qualitative and quantitative information related to an element of earth formation surrounding a borehole, comprising:

(1) neutron source means for irradiating the earth formation with neutrons of sufficient energy to interact with atoms of at least a given element according to the activation reaction;

(2) means for detecting and counting at at least two locations spaced from the source, the gamma rays emitted during the activation reaction;

(3) means for determining, at each depth, the number of gamma ray counts detected during a time period starting when the source passes that depth and ending when the detector passes that depth, this determination being made for each detector at each depth;

(4) means for establishing a relationship, for each depth, between the counts from the respective detectors for that depth and the corresponding times when the corresponding detector reaches that depth; and (5) means for deriving from the relationship at least one characteristic of said element.

The characteristics and advantages of the invention will appear better from the description to follow, given by way of a nonlimiting example, with reference to the appended drawing in which:

DESCRIPTION OF THE PREFERRED EMBODIMENTS

The invention will be hereafter depicted in connection with the logging techniques, and especially with the for the characterization, i.e. the detection and quantification of given elements of earth formation surrounding a borehole.

Figure 1:
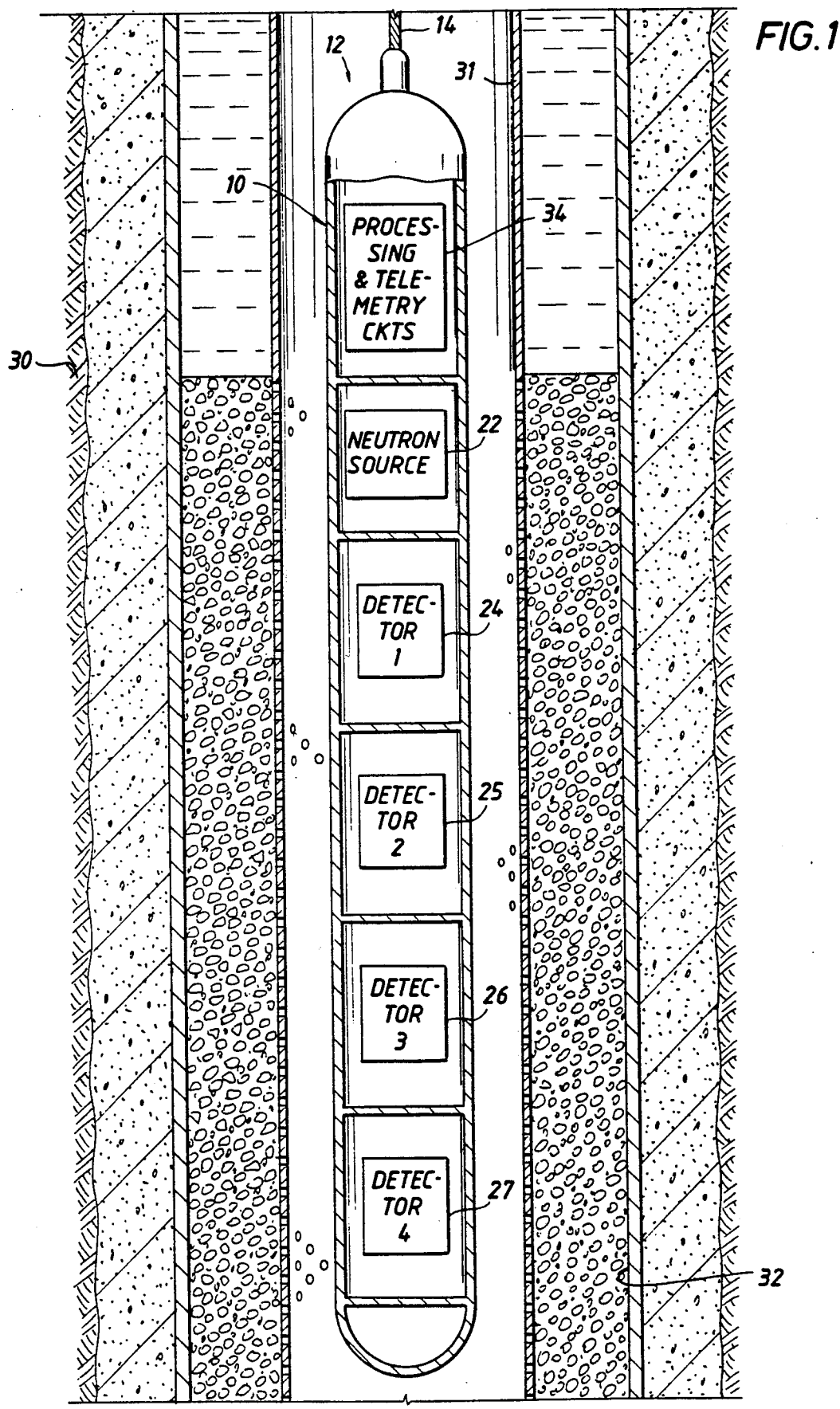
FIG. 1 shows an example of a logging tool according to the invention, provided with four detectors placed below the neutron source.

An example of an embodiment of the invention is described and illustrated in FIG. 1 showing a nuclear logging tool or sonde 10 suspended by an armored cable 14 in a borehole 12 surrounded by earth formations 30, and comprising a tubing 31 and a casing 32.

The downhole tool 10 includes a neutron source in the form of a pulsed neutron generator 22 and four gamma ray detectors 24, 25, 26 and 27 that are located at different distances (or spacings) from the neutron generator 22. The gamma ray detectors 24-27 are aligned along the longitudinal axis of the sonde 10, on the same side with respect to the neutron generator 22. For the illustration of the present invention, the neutron generator 22 is of the type which generates discrete pulses of fast neutrons, e.g. 14 Mev, and may for example be of the type described in more complete detail in U.S. Pat. No. 2,991,364 to C. Goodman, and U.S. Pat. No. 3,546,512 to A. H. Frentrop both patents being incorporated herein by reference. The generator emits 14 Mev neutrons having an energy level above the threshold energy level needed for the oxygen activation. Operation of the neutron generator 22 is controlled as usual by a neutron generator control circuit (not shown) which may also be of the type described in the aforementioned patents. The detectors 24, 25, 26 and 27 may be of any construction suitable for the detection of gamma rays, such as thallium-activated sodium iodide scintillation detectors or bismuth germanate crystal detectors. In this respect, the detectors will be understood to include the usual photomultiplier tubes, photomultiplier high voltage supplies, and amplifier-discriminators (not shown). It will also be understood that other downhole power sources (not shown) are provided as required to drive the neutron generator 22 and other downhole circuits. Power for the logging tool 10 is supplied over the cable 14 from a surface power supply (not shown), as is conventional.

Output pulses from the gamma ray detectors are applied to processing and telemetry circuits 34 which count and store the signals from the gamma ray detectors, and which include downhole telemetry circuits for transmission to the surface over the cable 14. These circuits are designed to achieve the timing schedules for neutron emission and gamma ray detection according to that discussed in detail below. The downhole telemetry circuits 34 may be of any known construction for encoding, time division multiplexing, or otherwise preparing the data-bearing signals. At the earth's surface, the data-bearing signals from the detectors 24, 25, 26 and 27, respectively, are amplified, decoded, demultiplexed and otherwise processed as needed in surface telemetry circuits (not shown) which may also be conventional. The telemetry circuits also included circuits for the receipt and transmission, respectively, of command messages from the surface.

Following transmission to surface telemetry circuits, the respective signals from each gamma ray detector are separately counted to acquire the counts data over a desired period of time, and then stored. From storage, the count data are processed in a computer which suitably comprises a microprocessor or, alternatively, a general purpose digital computer such as that manufactured by Digital Equipment Corporation, Maynard, Mass., under the designation PDP-11. As is described more fully herebelow, the computer processes the count data from the respective detectors to develop various desired outputs which may be recorded in conventional fashion as a function of tool depth in a recorder. The usual cable-following mechanical linkage is provided for this purpose. More details about the overall design of the above mentioned circuits can be found e.g. in U.S. Pat. No. 4,721,853, which is herein incorporated by reference.

The measurements carried out by the tool 10 are based on the nuclear reaction called "activation", as described e.g. in the article "Advances in Nuclear Production Logging" by P. A. Wichmann et al., Trans., SPWLA (1967). A nuclear source emits high energy neutrons which interact with certain atoms in the earth formation in such a way that these atoms are activated to an unstable state which decays back exponentially in time with a given half life, to a stable atom while emitting gamma rays of an energy representative of the activated atom.

After the tool has been lowered in the borehole, either down to the bottom or at a lower level than the zone to investigate, the neutron source is turned on and the tool is pulled out of the borehole while detecting the gamma rays resulting form the activation. The tool is pulled out at a given linear speed (usually called "logging speed") which is typically in the range of a few hundred to three thousand feet/hour. The logging speed is preferably chosen in relation to the element of interest, and more particularly to the half life of the corresponding atom, in order to minimize the influence of other atoms which might also be activated. Accordingly, the longer the atom half life, the slower the logging speed. When carrying out measurements related to oxygen, the logging speed will be faster than the logging speed when investigating for silicon or aluminum, which itself will be faster than for gold measurements. According to the teaching of the article from H. D. Scott and M. P. Smith hereabove referred to, the logging speed providing a maximum number of counts is given by the formula:

$$V = K d / t,$$

where "V" is the logging speed, "K" is a constant determined experimentally (e.g. K=0.693), "d" is the spacing between the detector and the source (in feet) and "t" is the half life time of the element of interest (in hours). For example, assuming the spacing "d" is equal to 5 feet, the respective logging speeds given by the hereabove mentioned formula is:

V = 1750 feet/hour for oxygen;

V = 100 feet/hour for silicon and/or aluminum.

Figure 5:
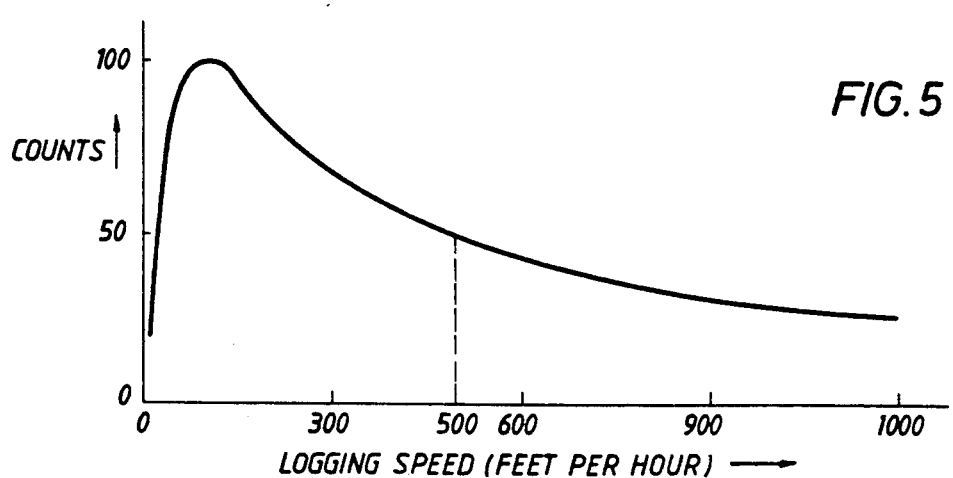
FIG. 5 is a plot showing the relationship between the logging speed and the number of counts from a single detector.

However, the optimum logging speed is actually a compromise taking into account opposite requirements. First, technical constraints limit the range of operational speeds to between 500 feet per hour and 3000 feet per hour. Second, business requirements push towards a logging speed as high as possible. Third, the relationship between the number of counts and the logging speed, as shown in FIG. 5 in the form of a plot of counts versus speed, from the article from H. D. Scott and M. P. Smith, is such that small variations around the speed value corresponding to the maximum number of counts leads to a large variation in the number of counts. This variation in the number of counts is detrimental to the measurements. The optimum logging speed is chosen in the part of the plot of FIG. 5 having a light slope, thus providing a reasonable number of counts without jeopardizing the measurement accuracy.

In case the tool has more than one detector, such as the tool of FIG. 1, the optimum logging speed is determined as hereabove mentioned, with "d" being the spacing of the detector closest to the source, or the intermediate detector (e.g. the second from the source, in case of a four detector tool). By way of example, the spacings of the respective detectors of the tool shown on FIG. 1 are respectively: between 5 and 20 inches, 20 and 35 inches, 40 and 50 inches, and 50 and 70 inches.

According to the above, a logging speed of 500 feet per hour constitutes, for aluminum/silicon, a compromise between the above mentioned constraints.

The source remains activated during all the time the measurements are carried out while the tool is pulled up in the borehole. The irradiation may be provided by either continuous neutrons emission or successive bursts of neutrons. a coordinates system counts versus time on which are plotted three substantially linear curves. Each curve is representative of an activated element, to wit, in the examples of FIG. 2, gold, silicon and oxygen. With each depth is associated one plot counts versus time and one curve. Each curve is made from four dots. Each dot is associated with a detector and represents the number of counts from that detector and the corresponding time of detection. The cross-plotting of counts versus time, for a given depth, is carried out as follows. First, for that depth, a time origin is set which is the time when the neutron source reaches that depth. Gamma rays are detected and counted at one detector during a time period starting from the time origin and ending when that detector reaches that depth. The time period depends on the logging speed and on the spacing between the source and the detector. Thus, one obtains, for that depth and for that detector, a number of gamma ray counts and a value for the above mentioned time period (e.g. a few seconds). The couple number of counts & time period generates a dot on the plot. These steps are repeated for each of the other detectors, still for the same depth. Finally, for that depth, are obtained four dots forming a curve, generally a substantially straight line. Since the tool is continuously moving in the borehole, the hereabove steps are repeated for each depth. Actually, a plot is made for every increment of depth. The increment is a function of the logging speed and of the ability in speed of the electronics to sample, store, transmit or otherwise process the data issued from the detector. For example, the depth increment is comprised between one inch and 12 inches..It has to be noted that the farther the detector from the neutron source, the longer the detection for that detector. As can be seen from FIG. 2, the farther the detector from the source, the less the number of counts, although the duration of detection increases as the detector spacing increases. This is because the activation fades away with time. As per the depths where there is no earth formation element susceptible to be activated, the gamma ray counts result on the corresponding plot in an horizontal line characteristic of the background.

Figure 2:
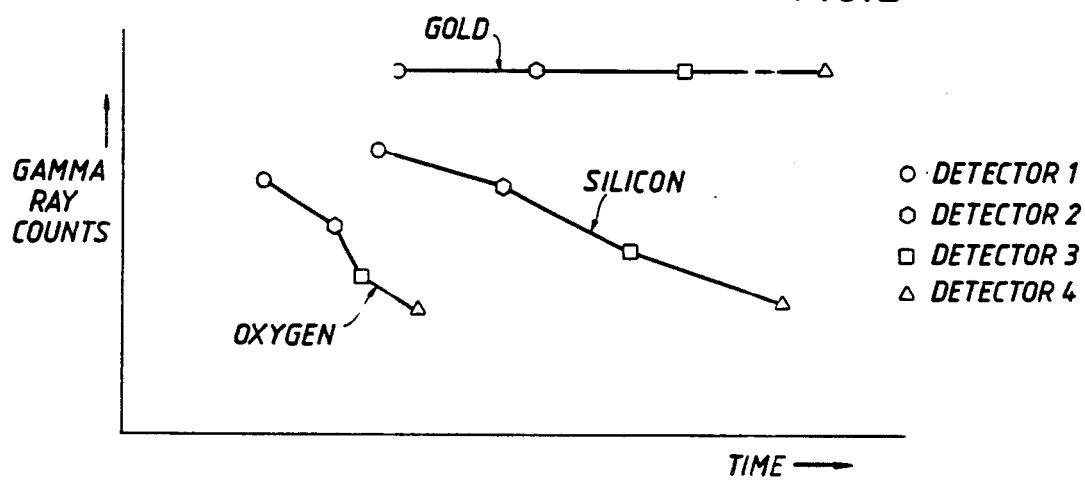
FIG. 2 shows a plot of counts versus time, of the counts detected respectively by the four detectors, showing different curves each being representative of an activated element.

Each curve forms approximately a straight line the slope of which is characteristic of the corresponding activated atom, and more particularly of its half life. In other words, the slope of the line is representative of the identity of the element. For example, FIG. 2 shows three curves corresponding respectively to oxygen, silicon and gold atoms. While FIG. 2 shows several theoretical examples of curves on the same co-ordinates system, actual measurements would provide a single curve passing through four points corresponding respectively to each detector. By measuring the slope of the line, one could be able to identify the kind of activated atom. This identification could be carried out e.g. by comparing the actual plot to a set of reference plots (counts versus time) established through laboratory measurements for each kind of element able to be activated, and thus determine which reference line has a slope closest to the slope of the actual line.

Figure 3:
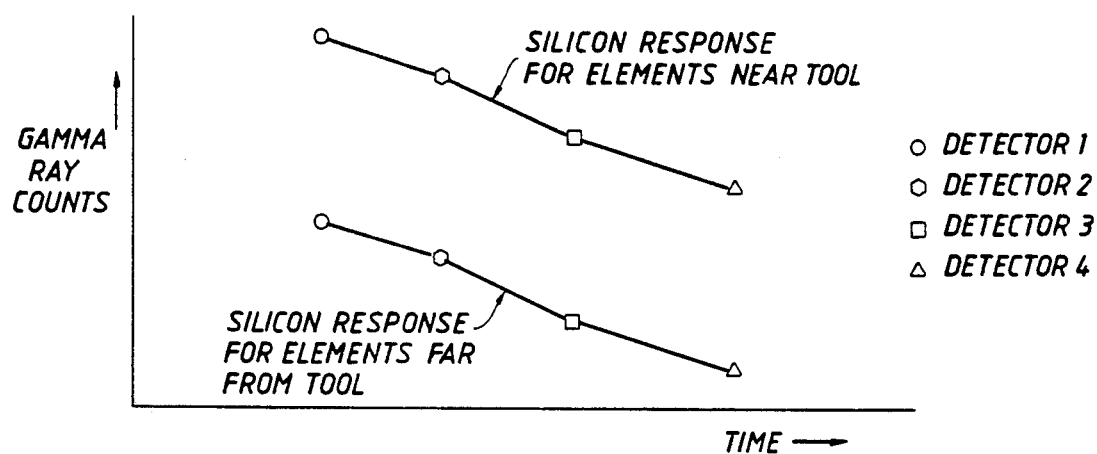
FIG. 3 shows two plots similar to those of FIG. 2, corresponding to the activation of silicon located at two different radial locations from the tool.

The method and the apparatus according to the invention also provide, besides the qualitative information as hereabove described, quantitative information about the activated atoms. The number of counts, as plotted, is a function of the activated level of the atoms, which is a compound function of the logging speed, the neutron source output, the quantity in volume of the earth formation area including the activated atoms, as well as the radial distance from the tool of the activated area. Thus, assuming the logging speed and the neutron source output are constant during the measurements, the number of counts for each detector, is representative of the quantity of activated atoms, compounded with the radial distance from the borehole of these atoms. FIG. 3 shows two plots of counts versus time, corresponding to the response to activation of silicon atoms, from two respective areas located at two different radial distances from the borehole. The plot farthest from the time axis corresponds to activation of silicon located near the tool, while the plot closest to the time axis corresponds to activation of silicon atoms located far from the tool, being understood that the words "near" and "far" are here used in their relative meanings. The depth of investigation (in the radial direction is typically of 3 or 4 feet. The number of counts derived from the plots provides a relative indication of the radial distance of the activated atoms within the range of investigation. The actual plots derived from the measurements are, to this end, compared to reference plots established through laboratory measurements.

Thus, through a quick look to the plots, the user is able: (i) to detect the presence of activated elements; (ii) to identify the activated atoms, by determining the slope of the line; (iii) and to quantify the amount and distance from the borehole of the activated atoms.

It has to be noted that although the tool hereabove described is provided with four detectors, it only requires basically, at least in theory, two detectors in order to be able to obtain a plot of counts versus time showing two dots from which could be inferred a line the slope of which is representative of the activated element.

Figure 4:
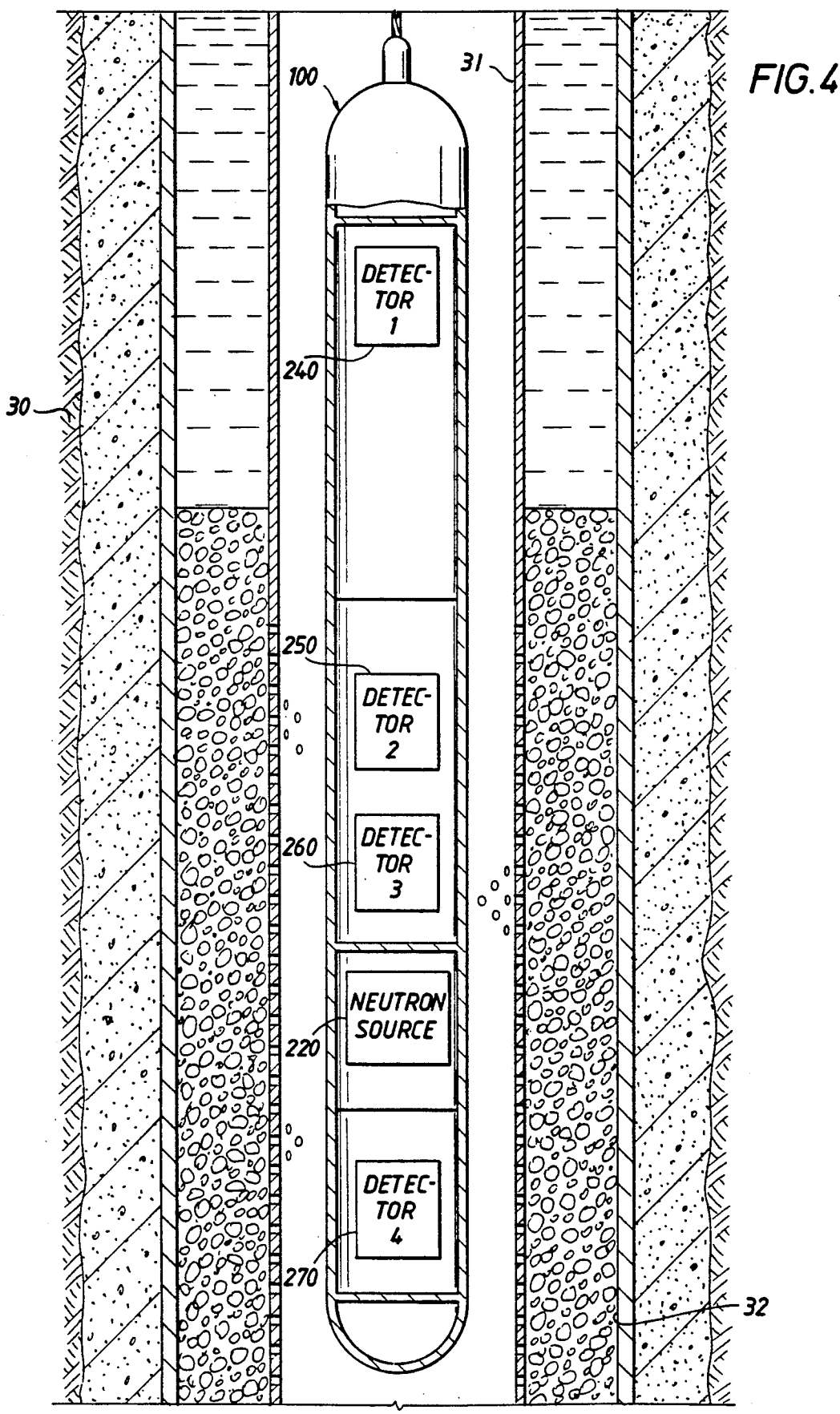
FIG. 4 shows an alternative embodiment of the tool.

Now there is described an alternative embodiment of the invention, wherein basically, only one detector is used to detect gamma rays, and the tool is run, i.e. lowered to the bottom and pulled up, several times in the borehole. Each run provides, for each depth, a dot on the corresponding plot. In other words, the dots on the plot are obtained from the successive runs, instead of several detectors as hereabove described. For example, one way to implement this alternate embodiment of the invention is now described in relation to FIG. 4 showing a logging tool consisting in the combination of several known nuclear logging tools. The tool 100 of FIG. 4 comprises, from top to bottom:

a first gamma ray detector 240 from a natural gamma ray tool, known as the Gamma Ray (GR) tool, such as described in U.S. Pat. No. 3,786,267, which is herein incorporated by reference;

a second and a third gamma ray detector, respectively 250 and 260, and a neutron source 220 similar to the source 22 shown on FIG. 3; these three components are part of a Thermal Decay Tool, or TDT tool, mark of Schlumberger Technology Corporation, such as described in U.S. Pat. No. 4,721,853; detectors 250 and 260 can be e.g. disposed at the following respective distances from the neutron source 220: between 5 and 20 inches, and 20 and 30 inches;

a fourth gamma ray detector 270 from a natural gamma ray tool (GR), disposed between 2 and 5 feet from the neutron source 220.

The advantage of the implementation as hereabove described in connection with FIG. 4, resides in the possibility of using and combining existing nuclear logging tools at the cost of slight modifications. The method according to this alternate embodiment comprises the steps of: (i) lowering the tool of FIG. 4 in the borehole, either down to the bottom of the borehole or below the zone to investigate; (ii) turning the neutron source on; (iii) pulling the tool at a logging speed related to the element under investigation; (iv) detecting gamma rays resulting from activation with a single detector; (v) determining the number of counts and the corresponding time periods according to the steps hereabove described in connection with FIG. 2: (vi) crossplotting, for each depth, the number of counts versus the corresponding time periods; (vii) turning the neutron source off; and (viii) repeating at least one more sequence including the steps (i), (iii), (iv), (v) and (vi). In other words, the tool is run in the borehole two times or more, at the same logging speed related to the element of interest, the first run being carried out with the neutron source on, and the remaining runs with the source off. According to the embodiment of the invention shown in FIG. 4, the measurements are carried out only with detector 270, i.e. the detector placed below the neutron source. For each run, a number of counts is determined as well as the corresponding time period. Thus, the different counts are plotted against the corresponding time period values so as to generated curves similar to the curves of FIG. 2 or 3. From each curve is derived information related to the earth formation element under investigation, as hereabove described. The uppermost gamma ray detector 240, disposed e.g. between 20 and 30 feet from the source, may be used for providing a background natural radioactivity level, to be subtracted from the gross measurements.

Although the invention has been described and illustrated with reference to a specific embodiment thereof, it will be understood by those skilled in the art that various modifications and variations of that embodiment may be made without departing from the invention concepts disclosed. Accordingly, all such modifications and variations are intended to be included within the spirit and scope of the appended claims.

What is claimed is:

1. A method for characterizing at least one activated element in an earth formation surrounding a borehole, comprising the steps of:
   (a) displacing in said borehole a sonde comprising a neutron source and at least two gamma ray detectors longitudinally spaced from said source, while irradiating said formation with neutrons of sufficient energy to interact with said element according to the activation reaction;
   (b) detecting and counting at each detector the gamma rays resulting from the activation of atoms of said element;
   (c) determining, at each depth, the number of gamma ray counts detected during the time period defined by the time instants when respectively said source and said detectors pass that depth, said determination of gamma ray counts being made for each detector at each depth;
   (d) establishing a relationship, for each depth, between the counts from the respective detectors for that depth and the corresponding time instants when the corresponding detector passes that depth; and (e) deriving from said relationship at least one characteristic of said element.

2. The method according to claim 1 further comprising:

setting one detector as a reference detector;

determining the time when another detector reaches a given depth by adding to the time when said reference detector reaches said depth, an additional time "Delta t" given by:

Delta t = d / V where "d" is the spacing between said reference detector and said another detector and "V" is the speed at which said sonde is displaced in said borehole.

3. The method according to claim 1 further comprising:

cross-plotting, for each depth, the gamma ray counts versus the corresponding times, one plot corresponding to one depth and including dots which forms a curve representative of said element at that depth; and deriving from said curve at least one characteristic of said element.

4. The method according to claim 3 wherein said curve is substantially a straight line the slope of which is representative of the identity of said element.

5. The method according to claim 1 wherein the counts for one detector are representative of the quantity of said element of the radial distance between said borehole and atoms of said element.

6. The method according to claim 1 wherein said sonde comprises four gamma ray detectors.

7. The method according to claim 1 wherein said detectors are disposed on the same side along the longitudinal axis of said sonde with respect to said neutron source.

8. A method for characterizing at least one activated element in an earth formation surrounding a borehole, comprising the steps of:

(a) lowering a sonde comprising a neutron source and a gamma ray detector down to the bottom of said borehole or below the zone of earth formation to investigate;

(b) pulling said sonde while irradiating said formation with neutrons of sufficient energy to interact with said element according to the activation reaction;

(c) detecting and counting at each detector the gamma rays resulting from the activation of atoms of said element;

(d) determining, at each depth, the number of gamma ray counts detected during the time period defined by the time instants when respectively said source and said detector pass that depth, said determination of gamma ray counts being made for each detector at each depth;

(e) establishing a relationship, for each depth, between the counts from the respective detectors for that depth and the corresponding time instants when the corresponding detector reaches that depth;

(f) repeating at least once the sequence including steps (a)-(e), said neutron source being turned off; and (g) deriving from said relationship at least one characteristic of said element.

9. The method according to claim 1 wherein said element comprises aluminum, silicon, magnesium or gold.

10. A logging apparatus for characterizing an element of earth formation surrounding a borehole, comprising a sonde comprising:

(1) neutron source means for irradiating said earth formation with neutrons of sufficient energy to interact with atoms of said element according to the activation reaction;

(2) means for detecting and counting at least two locations longitudinally spaced from said source, the gamma rays resulting from the activation of atoms of said element;

(3) means for determining, at each depth, the number of gamma ray counts detected during the time period defined by the time instants when respectively said source and said detector pass that depth, said determination being made for each detector at each depth;

(4) means for establishing a relationship, for each depth, between the counts from the respective detectors for that depth and the corresponding time instants when the corresponding detector reaches that depth; and (5) means for deriving from said relationship at least one characteristic of said element.

11. The apparatus according to claim 10 further comprising means for determining one time instant for a first detector including means for adding to the time instant of a second detector, the time "t" needed for the latter to reach that depth given by: t = d / V, where "d" is the spacing between the first and the second detector and "V" is the speed at which said sonde is displaced in said borehole.

12. The apparatus according to claim 10 further comprising:

means for cross-plotting the gamma ray counts versus time, wherein said relationship shows approximately the form of a straight line; and means for deriving from the slope of said line the identity of said element.

13. The apparatus according to claim 10 wherein the counts for one detector are representative of the quantity of said element and of the radial distance between said borehole and atoms of said element.

14. The apparatus according to claim 10 wherein said sonde comprises four gamma ray detecting means.

15. The apparatus according to claim 10 wherein said detecting means are disposed on the same side along the longitudinal axis of said sonde, with respect to said neutron source.

16. The apparatus according to claim 15 wherein said neutron source is disposed above said detecting means.

17. An apparatus for characterizing at least one activated element in an earth formation surrounding a borehole, comprising:

(a) means for lowering a sonde comprising a neutron source and a gamma ray detector down to the bottom of said borehole or below the zone of earth formation to investigate;

(b) means for pulling said sonde while irradiating said formation with neutrons of sufficient energy to interact with said element according to the activation reaction;

(c) means for determining, at each depth, the number of gamma ray counts detected at each detector during the time period defined by the time instants when respectively said source and said detector pass that depth, said determination being made of gamma ray counts for each detector at each depth;

(d) means for establishing a relationship, or each depth, between the counts from the respective detectors for that depth and the corresponding time instants when the corresponding detector reaches that depth;

(e) means for repeating at least once the sequence including steps a–e, said neutron source being turned off; and (f) means for deriving from said relationship at least one characteristic of said element.

18. The method according to claim 1 wherein the relationship in step (d) is established by cross-plotting for each detector the gamma ray counts versus the corresponding instant of time for that count.

19. A method for characterizing an element of an earth formation surrounding a borehole by activating atoms in said element comprising the steps of:

(a) irradiating said formation with neutrons of sufficient energy to activate atoms of at least one element in the formation;

(b) detecting and counting the gamma rays resulting from the activation of atoms in said formation at at least two time instances;

(c) determining from the counted gamma rays and time intervals the reduction rate of gamma rays; and (d) deriving from the gamma ray reduction ray the activated element of said formation.

20. The method according to claim 19 wherein the gamma ray reduction rate is determined by plotting each gamma ray count versus the corresponding instant of time for that count.

21. The method according to claim 20 wherein the activation element is derived by comparing the gamma counts versus time plot to predetermined plots of various elements to determined the closest element match.

22. A method of characterizing an activated element in an earth formation surrounding a borehole by activating atoms in said element comprising the steps of:

(a) displacing in said borehole a sonde comprising a neutron source and at least two gamma ray detectors longitudinally spaced from said source, while irradiating said formation with neutrons of sufficient energy to activate atoms of at least one element in the formation;

(b) detecting and counting at each detector the gamma rays resulting from the activation of atoms in said formation;

(c) determining the number of gamma ray counts detected during the time period defined by the time instants when respectively said source and each said detector pass through an activated region of said earth formation;

(d) establishing a relationship between the counts from the respective detectors and the corresponding time instants when the detectors pass through the activated region of said formation; and (e) deriving from said relationship the activated element of said formation.

23. The method according to claim 22 wherein the relationship of step d is established by plotting for each detector, the gamma ray count for that detector versus the corresponding instant of time that count.

24. The method according to claim 22 wherein one detector is set as a reference detector and further comprising before step c the step of determining the time when another detector reaches the activated region, an additional time "Delta t" given by:

$$\text{Delta } t = d/V$$

where "d" is the spacing between said reference detector and said another detector and "V" is the speed at which said sonde is displaced in said borehole.

25. The method according to claim 22 wherein the counts for one detector are representative of the quantity of said activated element and of the radial distance between said borehole and atoms of said activated element.

26. The method according to claim 40 further comprising:

cross-plotting, for each activation region, the gamma ray counts from said detectors versus the corresponding times, the plot including dots which form a curve representative of said activated element in said activated region; and deriving from said curve at least one characteristic of said element.

27. The method according to claim 26 wherein said curve is substantially a straight line, the slope of which is representative of the identity of said activated element.

* * * * *